No. 648,898. Patented May 1, 1900.
W. C. COBB & A. B. ADKINS.
LOOM.
(Application filed Dec. 26, 1899.)
(No Model.)
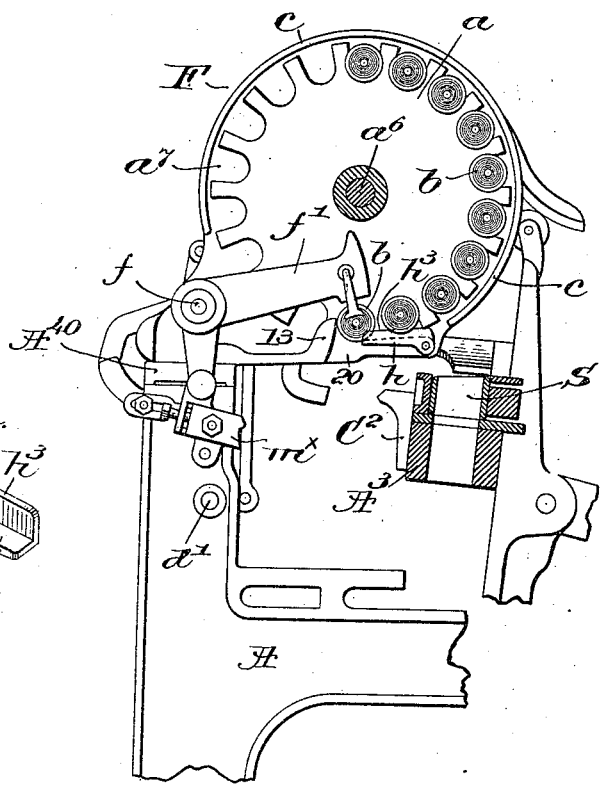
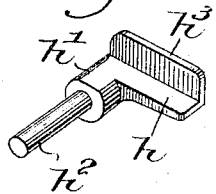
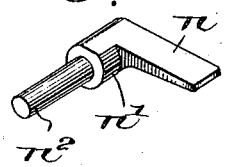
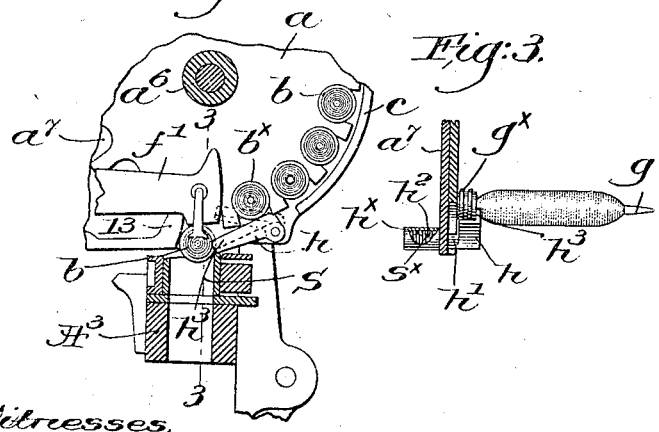
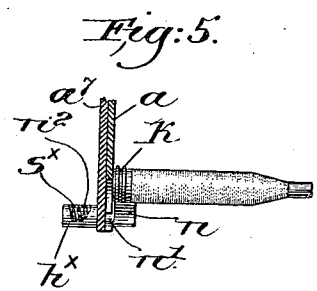
Witnesses,
Edward H. Allen
Gustave F. Magnitzky
Inventors,
William C. Cobb,
Andrew B. Adkins,
by Crosby & Gregory
Attys.

UNITED STATES PATENT OFFICE.

WILLIAM C. COBB AND ANDREW B. ADKINS, OF PELZER, SOUTH CAROLINA, ASSIGNORS TO THE DRAPER COMPANY, OF PORTLAND, MAINE, AND HOPEDALE, MASSACHUSETTS.

LOOM.

SPECIFICATION forming part of Letters Patent No. 648,898, dated May 1, 1900

Application filed December 26, 1899. Serial No. 741,520. (No model.)

*To all whom it may concern:*

Be it known that we, WILLIAM C. COBB and ANDREW B. ADKINS, citizens of the United States, residing at Pelzer, county of Anderson, State of South Carolina, have invented an Improvement in Automatic Looms, of which the following description, in connection with the accompanying drawings, is a specification, like letters and figures on the drawings representing like parts.

Automatic looms of the type shown in United States Patent No. 529,940 are provided with filling-supplying mechanism which includes an intermittingly-movable filling-feeder to hold a series of filling-carriers, which latter are by the movement of the feeder brought singly into position to be engaged by a transferrer and removed from the feeder. The movement of the feeder in said patent is effected by a spring, which is wound from time to time, the filling-carrier next to be transferred being brought into engagement with a fixed stop and holding the feeder at rest until a change of filling is to be effected. As the spring is quite strong, the carriers are subjected to considerable strain as they are engaged by the stop.

This invention has for its object the production of filling-supplying mechanism of the type referred to wherein means are provided for retarding the movement of the feeder before the filling-carrier reaches the fixed stop, so that the shock is taken up and reduced and a cushioning effect produced. The cushioning or retarding device also serves to yieldingly support the filling-carrier next to be transferred and to guide the same opposite the stop when transfer takes place.

Various novel features of our invention will be described hereinafter and particularly pointed out in the following claims.

Figure 1 is a transverse sectional view of a portion of a loom and its filling-supplying mechanism, the section being taken through the feeder, with the parts in normal position. Fig. 2 is a similar view of a portion of the mechanism shown in Fig. 1, but a filling-carrier is illustrated as being transferred. Fig. 3 is a vertical sectional detail on the line 3 3, Fig. 2, looking toward the right. Fig. 4 is an enlarged perspective view of the retarding or cushioning device detached. Fig. 5 is a sectional view similar to Fig. 3, showing a modified form of cushioning device; and Fig. 6 is an enlarged perspective detail of such modified form of cushioning device.

The loom-frame A, breast-beam $A^{10}$, the lay $A^3$, self-threading shuttle S, the transferrer $f$, mounted to rock on a stud $f$, the dog $m^\times$, operatively connected with the transferrer, the bunter $C^2$ on the lay, the rock-shaft $d'$ to control the operation of the transferrer, and the feeder F are and may be all substantially as shown in United States Patent No. 627,803, dated June 27, 1899.

The feeder F consists of two parallel disks, only one of which, as $a$, is shown, connected to rotate in unison on a stud $a^6$, fixed to the stand $a^5$, attached to the breast-beam, the disks holding the filling-carriers $b$ by their tips or heads, the feeder being rotated by suitable mechanism, not herein shown and substantially as in the patents referred to.

The stand has a fixed stop 13 thereon to engage the endmost filling-carrier of the series to thereby maintain the feeder at rest with said filling-carrier in position in the path of the transferrer, the stop forming one side of a discharge-throat 20, Fig. 1, and a guard $c$ is attached to the stand and extends around the periphery of the plate or disk $a$.

In our present invention the guard is cut away at its lower end some distance from the throat 20 and a cushioning or retarding device is interposed between the end of the guard and the throat, said device being shown herein as a flat plate $h$, having a lateral hub $h'$ at one end, reduced in diameter to form a stud $h^2$, which is extended through the stand $a^7$. A cap $h^\times$, Fig. 3, is secured to the stud at the opposite side of the stand and contains a spring $s^\times$, which is secured to the cap and the stand, the spring tending to lift the plate or buffer $h$ into the path of the filling-carriers, as shown in dotted lines, Fig. 2. Under normal conditions this buffer is depressed by the endmost filling-carrier into the position shown in Fig. 1, it at such time serving to yieldingly support the said filling-carrier at the side of the throat opposite the stop 13 and preventing accidental dislodgment of the filling-carrier. When the transferrer descends to remove the filling-carrier from the feeder to the shuttle, the buffer yields (see Fig. 2) and then serves not only as a support, but also as a guide for the filling-carrier as it is moved by the transferrer into the shuttle, guiding it up to the time it passes through the throat. As soon as the transferrer is retracted the buffer is moved up by its spring into dotted-line position, Fig. 2, into the path of the next filling-carrier, as $b^x$, of the series, and as the feeder moves forward the buffer is depressed gradually into the position shown in Fig. 1. The resistance offered by the buffer-spring $s^x$ thus makes the buffer at such time act as a cushioning or retarding device to take up the shock of the feeder-actuating spring and allows the endmost filling-carrier to come gradually against the stop 13 instead of with a quick sudden jar.

If cops are used in the feeder, we prefer to provide the buffer with a longitudinal upturned flange or lip $h^3$, Figs. 1 to 4, on its outer edge to fit into the space between the head $g^x$ of the cop-skewer $g$, Fig. 3, and the yarn mass to aid in positioning the filling-carrier when transferred.

When bobbins are used in the feeder, the yarn mass is wound right up to the head $k$ of the bobbin, Fig. 5, and then the buffer is made merely as a flat plate $n$, Figs. 5 and 6, without any guide-flange, the hub $n'$ and stud $n^2$ corresponding to the parts $h'h^2$. (Shown in Fig. 4.)

Our invention is not restricted to the precise construction and arrangement herein shown, as the same may be modified or rearranged without departing from the spirit and scope of our invention.

Having described our invention, what we claim as new, and desire to secure by Letters Patent, is—

1. A movable filling-feeder to hold a series of filling-carriers and bring them singly into operative position, a stop to engage the filling-carrier next to be removed and maintain the feeder at rest, and a yieldingly-mounted buffer, removal of the endmost filling-carrier permitting the buffer to move into the path of the next one, to thereby retard and take up the shock of feeder movement and be gradually returned to normal position by the passage thereover of the filling-carrier as it reaches the stop.

2. A movable filling-feeder to hold a series of filling-carriers and bring them singly into operative position, a stop to engage the filling-carrier next to be removed and maintain the feeder at rest, and a spring-controlled buffer pivotally mounted opposite the stop, a filling-carrier when removed from the feeder being yieldingly supported and guided at one side by the buffer, the latter thereafter moving into the path of the next filling-carrier to take up the shock of feeder movement as the buffer is returned to normal position by the passage thereover of the said filling-carrier.

3. A movable filling-feeder to hold a series of filling-carriers and bring them singly into operative position, a stop to engage the filling-carrier next to be removed and maintain the feeder at rest, a pivotally-mounted plate opposite the stop, and a spring to lift the plate, a filling-carrier when removed from the feeder passing between the stop and said plate and being yieldingly supported by the latter, the plate thereafter being moved by its spring into the path of the next filling-carrier, to yieldingly take up the shock of the feeder movement.

4. An intermittingly-movable filling-feeder to hold a series of filling-carriers, a fixed stop to engage the endmost filling-carrier of the series and thereby maintain the feeder at rest, and a yieldingly-mounted buffer-plate opposite the stop, said plate having an upturned, longitudinal guide-flange, the plate moving into the path of the filling-carriers after removal of the endmost filling-carrier, to thereby take up the shock of feeder movement and be depressed into normal position when the feeder is brought to rest.

5. An intermittingly-rotatable filling-feeder to bring the filling-carriers one by one into operative position, a stand for the feeder, having a discharge-throat for the filling-carriers, a stop on one side of the throat, and a yielding buffer at the opposite side, and normally acting to yieldingly support the filling-carrier next to be removed, said buffer thereafter moving into the path of the next filling-carrier, to take up the shock of feeder movement.

6. A movable filling-feeder to hold a series of filling-carriers and to operatively position the filling-carriers one after another, a stop to engage the endmost filling-carrier of the series, and a retarding or cushioning device to engage the next filling-carrier of the series after the endmost one has been removed, to thereby retard the movement of the feeder and prevent sudden impact of the engaged filling-carrier with the stop.

7. A movable filling-feeder to hold a series of filling-carriers and to operatively position the filling-carriers one after another, and a yieldingly-mounted retarding or cushioning device to engage the next filling-carrier of the series after the endmost one has been removed, to thereby retard the movement of the feeder, the said device normally extending into the path of and yieldingly supporting the endmost filling-carrier until it is removed from the feeder.

In testimony whereof we have signed our names to this specification in the presence of two subscribing witnesses.

WILLIAM C. COBB.
ANDREW B. ADKINS.

Witnesses:
J. J. NELSON.
F. B. SPENCER.